United States Patent [19]

Akiba

[11] 4,020,875

[45] May 3, 1977

[54] WAVEGUIDE ELEMENTS

[75] Inventor: Kosuke Akiba, Tama, Japan

[73] Assignee: Sony Corporation, Tokyo, Japan

[22] Filed: Aug. 11, 1975

[21] Appl. No.: 603,535

[30] Foreign Application Priority Data

Aug. 14, 1974 Japan ........................ 49-97003[U]

[52] U.S. Cl. ............................... 138/128; 138/139; 138/143; 138/163; 333/95 A

[51] Int. Cl.² ..................... H01P 3/14; F16L 11/12

[58] Field of Search ....... 138/103, 109, 118, 118.1, 138/120, 128, 137, 139, 140, 143, 155, 156, 163, 177; 333/95 A, 95 S, 95 R, 23, 83 R, 98 R; 174/68 C, 70 C; 29/195 P; 427/304, 305, 306; 428/461, 462

[56] References Cited

UNITED STATES PATENTS

| | | | |
|---|---|---|---|
| 2,381,367 | 8/1945 | Quayle | 138/156 X |
| 2,793,989 | 5/1957 | Goodman et al. | 138/177 X |
| 3,008,104 | 11/1961 | Scapple et al. | 333/95 A |
| 3,195,079 | 7/1965 | Burton et al. | 138/156 X |
| 3,479,160 | 11/1969 | Klinger et al. | 29/195 P |
| 3,479,621 | 11/1969 | Martin | 138/143 X |
| 3,715,265 | 2/1973 | Allen et al. | 138/149X |
| 3,774,648 | 11/1973 | Edlin | 138/177 |

FOREIGN PATENTS OR APPLICATIONS

| | | | |
|---|---|---|---|
| 1,363,076 | 8/1974 | United Kingdom | 138/159 |

*Primary Examiner*—Richard E. Aegerter
*Assistant Examiner*—Richard R. Stearns
*Attorney, Agent, or Firm*—Lewis H. Eslinger; Alvin Sinderbrand

[57] ABSTRACT

A waveguide element is formed of a body of plastics resin, such as, acrylonitrile-butadiene-styrene resin, having a tubular portion open at its opposite ends and flanges directed outwardly at such ends, and a conductive layer, for example, of an electroless plated metal such as tin-cobalt alloy, covering the inner surface of the tubular portion and the surfaces of the flanges which face axially in the directions that the respective ends open. For ease of molding or forming the body of plastics resin, such body may be comprised of a pair of complementary parts divided at a plane extending longitudinally in respect to the tubular portion, with such parts having mating flanges directed outwardly along their longitudinal edges and with the conductive layer also covering the confronting surfaces of the mating flanges.

5 Claims, 3 Drawing Figures

WAVEGUIDE ELEMENTS

BACKGROUND OF THE INVENTION

1. Field of the Invention

This invention relates generally to waveguides such as are usually used for transmitting microwave signals, and more particularly is directed to improvements in waveguide elements which may be assembled in end-to-end relation to form a waveguide line of substantial length.

2. Description of the Prior Art

Microwave signals are usually transmitted by a waveguide line which is constructed of a plurality of waveguide elements assembled together in end-to-end relation. Several types of waveguide elements have been proposed. Usually, these waveguide elements each consist of a tubular portion of rectangular or circular cross-section and flanges provided at the ends of the tubular portion so that successive waveguide elements can be secured together in end-to-end relation by means of their adjacent flanges to form a waveguide line of substantial length which may be joined to other related microwave devices by means of the flanges on the waveguide elements at the ends of such line. The tubular portions of the waveguide elements function both to form a transmission path for a microwave signal and to make the waveguide line self-supporting or rigid. The existing waveguide elements are usually formed entirely of metal, particularly of copper or an alloy thereof. Since the thicknesses of the tubular portions and flanges of such waveguide elements are dictated by their function of making the waveguide line self-supporting or rigid, rather than by the function of forming a transmission path for the microwave signal, for which purpose only very thin metal structures are sufficient, the existing waveguide elements formed entirely of metal are undesirably heavy and, therefore, difficult to handle, as well as being relatively costly.

OBJECTS AND SUMMARY OF THE INVENTION

Accordingly, it is an object of the present invention to provide improved waveguide elements avoiding the above mentioned disadvantages of the prior art.

Another object of the invention is to provide waveguide elements which are relatively light in weight, and which can be manufactured easily and inexpensively.

In accordance with an aspect of the present invention, a waveguide element is provided with a body of plastics resin having a tubular portion open at its ends and flanges directed outwardly at such ends, and a thin conductive layer covering the inner surface of the tubular portion and the surfaces of the flanges which face axially in the directions that the respective ends open. The relatively light-weight plastics body of the waveguide element provides the requisite structural strength thereof, while the thin conductive layer, which may be applied by the electroless plating of the body with a tin-cobalt alloy, provides the transmission path for the microwave signal at the conductive layer on the inner surface of the tubular portion and also provides for the electrical connection of the waveguide element to adjacent similar waveguide elements or other devices at the conductive layer on the flanges.

The above, and other objects, features and advantages of the invention, will be apparent in the following detailed description of illustrative embodiments which is to be read in connection with the accompanying drawings.

DESCRIPTION OF PREFERRED EMBODIMENTS

Figure 1:
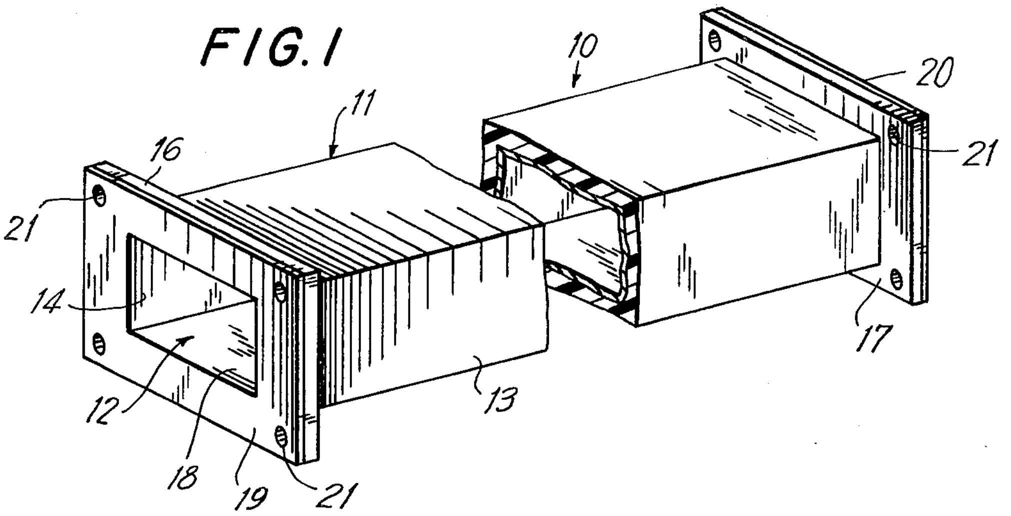
FIG. 1 is a perspective view, partly broken away and in section, of one embodiment of a waveguide element according to the present invention.
Figure 2:
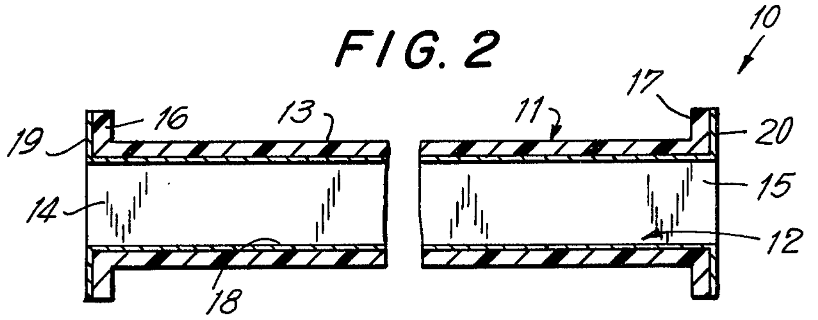
FIG. 2 is a longitudinal sectional view of the waveguide element of FIG. 1.

Referring to the drawings in detail, and initially to FIGS. 1 and 2 thereof, it will be seen that a waveguide element 10 according to an embodiment of the invention is there shown to generally comprise a one-piece body 11 of plastics resin, for example, acrylonitrile-butadiene-styrene resin (ABS resin), and a thin conductive layer 12, for example, of a tin-cobalt alloy or other suitable metal which is applied to the plastics resin body 11 by the electroless plating of the latter.

The body 11 includes a tubular portion 13 which is open at its ends, as at 14 and 15 on FIG. 2, and flanges 16 and 17 directed outwardly from the open ends 14 and 15, respectively, of tubular portion 13. The tubular portion 13 of body 11 may be formed with a rectangular cross section, as shown, or with a circular or any other suitable cross-sectional shape.

The thin conductive layer 12, which may have a thickness of only several microns, covers the inner surface of tubular portion 13, as at 18, and also covers the surfaces of flanges 16 and 17 which face axially in the directions that the respective ends 14 and 15 open, as at 19 and 20, respectively. The flanges 16 and 17 and the portions 19 and 20 of the continuous conductive layer 12 covering surfaces of such flanges are formed with a plurality of holes 21 extending therethrough (FIG. 1).

It will be apparent that the above described waveguide element 10 can be assembled together in end-to-end relation with a plurality of similar waveguide elements so as to provide a waveguide line of substantial length. In such waveguide line, the successive elements 10 are secured to each other by means of suitable fastenings extending through the holes 21 in their adjacent flanges 16 and 17. Further, the ends of the resulting waveguide line may be similarly joined to other related microwave devices. When a waveguide line is thus formed from a plurality of the described waveguide elements 10, the conductive layer 12 covering the inner surface of each tubular portion 11, as at 18, forms a guiding or transmitting path for a microwave signal, while the relatively lightweight plastics body 11 provides the requisite structural strength for ensuring that the guiding or transmitting path will not be distorted, that is, for ensuring that the waveguide line will be self-supporting or rigid. Further, it will be seen that the portions 19 and 20 of conductive layer 12 on flanges 16 and 17, respectively, serve to provide electrical connections between the portion of the guiding or transmitting path in each waveguide element 10 and the portions of the guiding or transmitting path in the next adjacent waveguide elements. Thus, insofar as the transmission of a microwave signal is concerned, the waveguide element 10 according to this invention functions in the same manner as the waveguide elements of the prior art which were formed wholly of metal. However, since the major portion of the mass of waveguide element 10 according to this invention is constituted by the relatively lightweight plastics body 11 thereof, such element 10 is light in weight and easily handled. Further, the waveguide element 10 can be easily and inexpensively manufactured through the use of conventional plastic molding techniques for the production of its body 11, and through the use of electroless plating for the application of the conductive layer 12 to such molded body. Since the conductive layer 12 can be very thin, the consumption of relatively costly metal for defining the microwave guiding or transmitting path is minimized.

Figure 3:
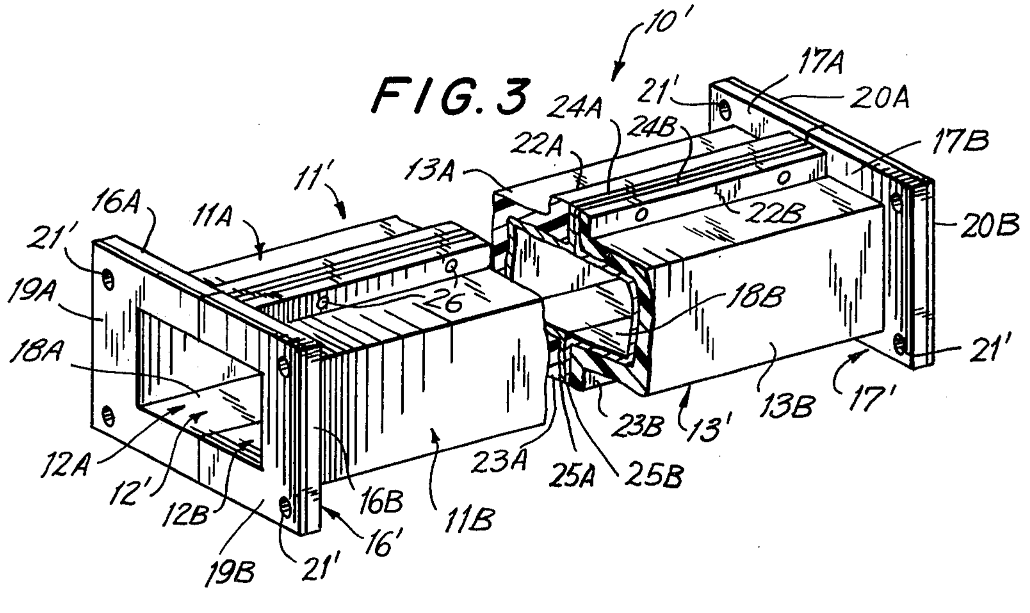
FIG. 3 is a view similar to that of FIG. 1, but showing another embodiment of a waveguide element according to the present invention.

Referring now to FIG. 3 showing a waveguide element 10' according to another embodiment of this invention, it will be seen that such waveguide element 10' generally comprises a body 11' of a suitable plastics resin which is constituted by a pair of complementary parts 11A and 11B which may be separately molded, for example, of ABS resin, and a thin conductive layer 12' constituted by thin conductive layers 12A and 12B applied to body parts 11A and 11B, respectively, for example, by the electroless plating of the latter with a suitable metal, such as, a tin-cobalt alloy.

As in the case of the previously described waveguide element 10, the body 11' of waveguide element 10' includes a tubular portion 13' which is open at its ends and flanges 16' and 17' directed outwardly at the open ends of tubular portion 13'. However, the parts 11A and 11B constituting body 11' are divided at a plane extending longitudinally in respect to tubular portion 13' so that the latter is constituted by channel-like portions 13A and 13B of parts 11A and 11B which, in the assembled or completed waveguide element 10', open toward each other. Further, body parts 11A and 11B are respectively molded or formed with flange portions 16A and 17A and flange portions 16B and 17B directed outwardly from the opposite ends of the respective channel-shaped portions 13A and 13B. Preferably, as shown, body part 11A is also molded or formed with flanges 22A and 23A directed outwardly from the opposite longitudinal edges of channel-shaped portion 13A between flange portions 16A and 17A, while body part 11B is similarly formed with flanges 22B and 23B.

The continuous thin conductive layer 12A applied to body part 11A covers the inner surface of channel-shaped portion 13A, as at 18A, the surfaces of flange portions 16A and 17A which face in the axial directions that the respective ends of tubular portion 13' open, as at 19A and 20A, and also the surfaces of flanges 22A and 23A that confront flanges 22B and 23B of body part 11B, as at 24A and 25A. Similarly, the continuous thin conductive layer 12B is applied to body part 11B so as to cover the inner surface of its channel-shaped portion 13B, as at 18B, the outer surfaces of flange portions 16B and 17B, as at 19B and 20B, respectively, and the surfaces of flanges 22B and 23B that confront flanges 22A and 23A, as at 24B and 25B, respectively.

The body parts 11A and 11B with the conductive layers 12A and 12B thereon are joined together in the relation shown on FIG. 3, for example, by means of a suitably conductive adhesive applied to their mating surfaces, or by means of suitable fastenings extended through holes 26 formed in the flanges 22A and 22B and the flanges 23A and 23B. Finally, the waveguide element 10' resulting from such joining of the body parts 11A and 11B may be assembled in end-to-end relation with similarly formed waveguide elements by means of suitable fastenings extended through holes 21' formed in the flanges 16' and 17'.

In order to ensure that the joints between body parts 11A and 11B of waveguide element 10' and the resulting joints in the conductive layer 12' within tubular portion 13' will exert a minimum or negligible effect on the electromagnetic field of a microwave signal, transmitted through element 10', the locations of the joints between body parts 11A and 11B are selected in relation to the mode of the transmitted microwave signal. For example, when the waveguide element 10' is intended for transmitting a microwave of $TE_{10}$ wave mode, its tubular portion 13B is provided with a rectangular cross-section, as shown on FIG. 3, and the body parts 11A and 11B are divided at a longitudinally extending plane which bisects the relatively longer sides of such rectangular cross-section, whereby the joints in the conductive layer 12' within tubular portion 13' will have a negligible if any effect on the electromagnetic field of the transmitted microwave signal.

It will be apparent that the waveguide element 10' has all of the advantages described above with respect to waveguide element 10, while the body parts 11A and 11B which combine to form the body 11' are more easily molded than the one-piece body 11 of the first described embodiment.

Although illustrative embodiments of the invention have been described in detail herein with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A microwave waveguide element for transmitting microwave signals comprising first and second complementary body parts each formed of plastics resin and each having a rectangular longitudinal channel, said first and second body parts each having a pair of longitudinal mating flanges parallel to said channel and along the longitudinal edges thereof; a continuous conductive metal layer applied by electroless plating to the surface of each said channel and to the surface of each said mating flange and means for joining the respective mating flanges of said first and second body parts to form a tubular microwave waveguide element with a rectangular cross-section having the longitudinal joints in said metal layer provided in the respective relatively longer sides of said rectangular cross-section.

2. A wave guide element according to claim 1; in which said first and second body parts each has a flange of said plastics material directed outwardly at axially opposite ends thereof, and said conductive metal layer also is applied to the surface of each said flange which faces axially in the direction that said respective end opens.

3. A waveguide element according to claim 2; in which said metal is a tin-cobalt alloy.

4. A waveguide element according to claim 3; in which said plastics resin in acrylonitrile-butadiene-styrene resin.

5. A microwave waveguide element according to claim 1 in which the longitudinal joints in said rectangular cross-section formed at the joined first and second body parts have negligible effects on the transmission of a microwave signal transmitted in the $TE_{10}$ mode.

* * * * *